United States Patent [19]

Piersall

[11] 4,173,918
[45] Nov. 13, 1979

[54] ROOF BOLT AND THE LIKE

[76] Inventor: Raymond Piersall, Lake Spa Mobile Home Pk., Star Rte. 1, Box 10, Niland, Calif. 92257

[21] Appl. No.: 890,260

[22] Filed: Mar. 27, 1978

[51] Int. Cl.² .................. F16B 13/06; F16B 31/02
[52] U.S. Cl. ........................................... 85/75; 85/61
[58] Field of Search ............... 85/9 R, 61, 62, 73, 85/72, 74, 75, 76, 77; 151/5; 403/2; 61/45 B

[56] References Cited

U.S. PATENT DOCUMENTS

| | | | |
|---|---|---|---|
| 2,159,580 | 5/1939 | Zifferer | 85/75 |
| 2,165,656 | 7/1939 | Ryan | 85/9 R |
| 2,408,559 | 10/1946 | Keating | 85/77 |
| 2,647,431 | 4/1953 | Lewis | 85/75 |
| 3,188,815 | 6/1965 | Schuermann et al. | 85/76 X |
| 3,191,486 | 6/1965 | Gibbens | 85/61 |
| 3,267,792 | 8/1966 | Yackle | 85/61 |
| 3,315,557 | 4/1967 | Dickow | 85/75 |

FOREIGN PATENT DOCUMENTS

| | | | |
|---|---|---|---|
| 985537 | 3/1976 | Canada | 85/76 |
| 2547634 | 4/1977 | Fed. Rep. of Germany | 85/77 |
| 756524 | 9/1933 | France | 85/9 R |
| 1179556 | 12/1958 | France | 85/73 |
| 84373 | 10/1954 | Norway | 85/75 |
| 218367 | 1/1968 | Sweden | 85/75 |

Primary Examiner—Thomas J. Holko
Attorney, Agent, or Firm—Kyle W. Rost

[57] ABSTRACT

A roof bolt for use in a predrilled hole in a mine has an elongated stud on which is mounted a cylindrical sleeve. The first or inner end of the stud is threaded and carries a wedge adapted to enter one end of the sleeve and forcefully expand it in response to the rotation of the stud. The second or outer end of the stud is threaded in a like direction and carries a nut, held in a fixed position of rotation on the stud by a shear pin engaged in a common hole through part of the nut and stud. A shoulder plate is carried on the stud between the nut and sleeve, and the second end of the stud has a backing plate attached.

1 Claim, 3 Drawing Figures

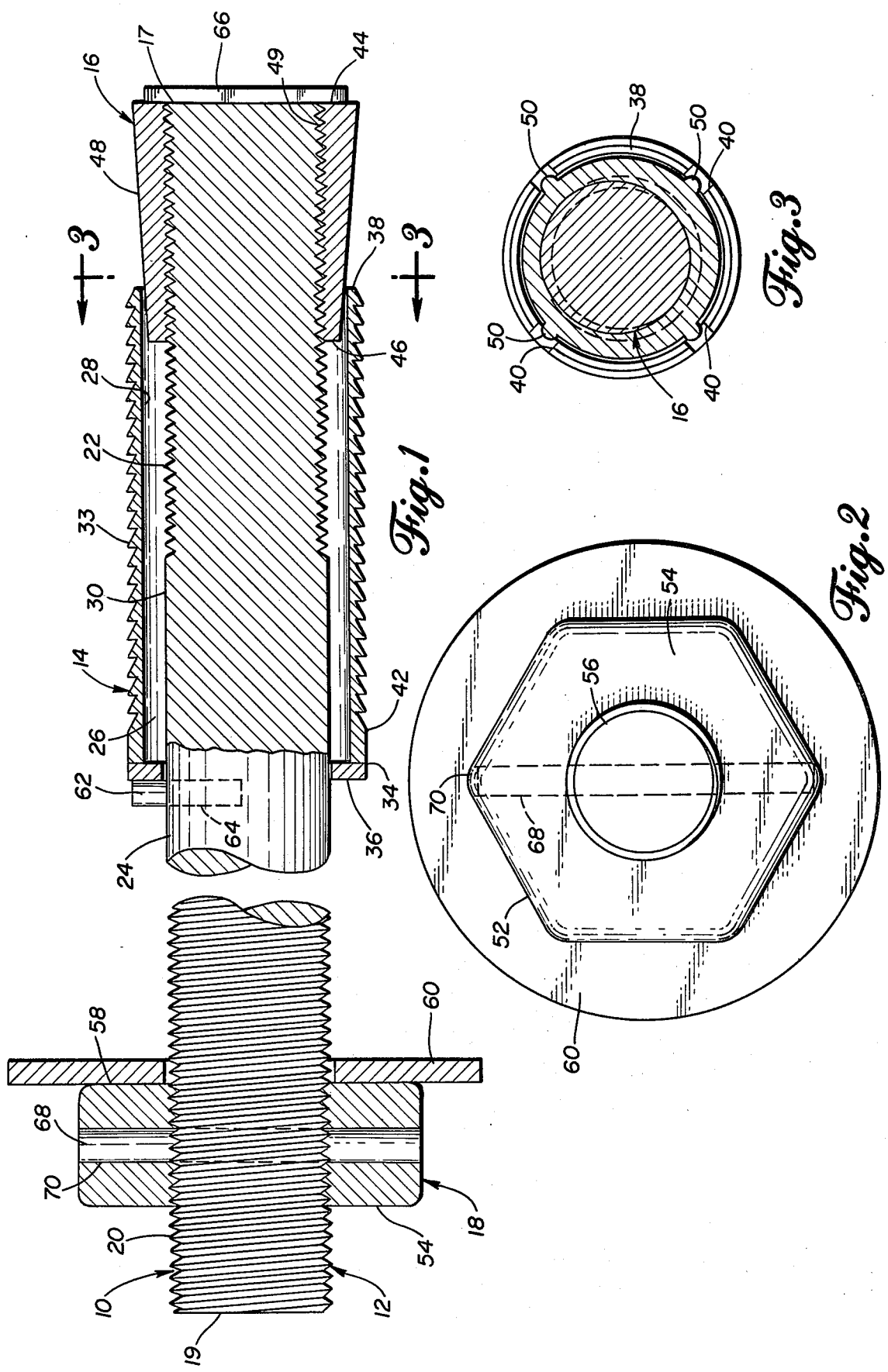

ROOF BOLT AND THE LIKE

BACKGROUND OF THE INVENTION

1. Field of the Invention

The invention relates to driven, headed, and screw-threaded fastenings. More specifically, the invention relates to an expansion-type bolt suited for anchoring in rock, as in mines and the like.

2. Description of the Prior Art

Various types of expansion bolts have in the past been used for mining and other applications. The uniform object of such known expansion bolts is to create a structure that will engage the surrounding rock of a predrilled hole and support a load applied to the bolt.

In the mining industry, one of the primary functions of such expansion bolts is to hold the roof of the mine in place against collapse. For this purpose, expansion bolts known as roof bolts have been employed. Prior to the use of roof bolts, mine roofs were supported by timbers in post and lintel construction. The lintels carried the weight of the mine roof. With the greater use of mobile machinery in mining, the danger arose that the post timbers might be bumped by the machinery, resulting in the collapse of a post and lintel, and further resulting in the collapse of a portion of the mine roof.

The roof bolt eliminated the need for post and lintel construction. It was discovered that the mine roof could be supported by bolts having their anchor point at a predetermined distance above the mine roof. Hence, it became the modern practice to bore long holes in the mine roof, for example, seven feet long, and anchor a seven foot long expansion bolt in the hole, with the expansion portion at the furthest end of the hole.

Properly setting a roof bolt in the rock is preferably accomplished by applying a known torque to the bolt. Since the roof bolt is expected to support a predetermined weight of rock against collapse, the consequences of improperly installing the bolt are severe. It is also desirable to assure that the bolt is engaging the walls of the predrilled hole in which it is anchored with uniform force throughout the circumference of the expansion portion, providing maximum protection against slippage. These functions are accomplished by proper design of the expansion portion and proper tightening of the bolt.

In the prior art, expansion bolts are known to employ a split sleeve over the bolt end, and this sleeve is cammed outwardly with the split providing the region at which the portions of the sleeve pivot away from one another. A disadvantage of this construction is that the expansion portion does not necessarily apply pressure evenly in circumferential distribution, and some portion of the split sleeve may be overly deformed during tightening of the bolt. Any resultant slippage of the bolt can lead to a hazardous condition in the mine.

A further problem in the prior art is that a roof bolt is required to perform two functions that may interfere with one another. First, the bolt should firmly engage the deepest part of a predrilled hole with radial pressure. Second, the bolt should apply slight pressure between the deeply anchored portion and the head of the bolt, placing the rock in compression and correspondingly placing the bolt in longitudinal tension. These two functions may conflict if, for example, the radial pressure at the expansion portion of the bolt locks the bolt in a longitudinal position wherein there is insufficient longitudinal tension in the bolt. This condition would result if the head of the bolt were not drawn snugly against the rock shoulder around the predrilled bolt hole before the bolt became anchored.

The present invention resolves the above noted problems in roof bolts and offers a general improvement in the construction and reliability of such devices.

SUMMARY OF THE INVENTION

A roof bolt for use in supporting the roof of mine tunnels has an elongated stud with an expansion sleeve at the inner end, first inserted into a predrilled hole, and a wedge threadedly connected to the stud to be forced between the sleeve and stud when the stud is turned, camming the sleeve radially outwardly against the wall of the hole. The sleeve is formed from cylindrical tubing having a roughened exterior circumferential surface, annealed to spring steel, and having slots therein that mate with ribs on the surface of the wedge to prevent the wedge from rotating relative to the sleeve as the stud turns. The outer end of the stud is threaded in the same direction as the inner end and carries a nut attached thereto by a shear pin designed to yield when a predetermined torque is applied to the nut. A rock plate supports the nut against the rock shoulder at the outer end of the predrilled hole, and a backing plate retains the wedge on the inner end of the stud.

The main object of the invention is to create a roof bolt for mining purposes, wherein the bolt provides a controlled torque for expanding an expansion sleeve deeply set in a predrilled hole. This torque is applied independently of the usual longitudinal tension under which the bolt is placed, so that the expansion sleeve can be properly set and the bolt can subsequently be longitudinally tensioned.

Another important object of the invention is to create an expansion sleeve that is not split at its base. A sleeve having an unsplit portion at least at its base maintains more uniform circumferential distribution of expansion forces.

BRIEF DESCRIPTION OF THE DRAWINGS

FIG. 1 is side elevational view of the roof bolt in partial section.

FIG. 2 is an end elevational view of the bolt, taken from the left hand end of FIG. 1, showing the shear pin in phantom.

FIG. 3 is cross-sectional view taken along the plane of line 3—3 of FIG. 1.

DESCRIPTION OF THE PREFERRED EMBODIMENT

As best shown in FIG. 1, the roof bolt 10 includes an elongated stud 12 having an annular sleeve 14 thereon, a wedge member 16 engaging a portion of the stud near the first or inner end 17 of the stud, and a nut member 18 near the second or outer end 19 of the stud. The relative terms "inner" and "outer" end of the stud shall refer the ends with respect to their intended position in a predrilled hole, the inner end being the end inserted into the hole and the outer end being the end remaining outside the hole.

Stud 12 in its simplist form is threaded at 20 on the cylindrical surface near the outer end thereof and at 22 near the inner end thereof, in both cases with the threads running in the same direction, preferably the conventional direction for clockwise rotation of the stud for engagement with a nut, as viewed from the outside end of the stud. An intermediate shank portion 24 of the stud separates threaded portions 20 and 22 and may be threaded or unthreaded. In FIG. 1, this portion 24 is shown to be unthreaded, since the threads in the shank portion are unnecessary for most applications. The total length of the stud between ends 17 and 19 are variable, but for purposes of supporting the roof of a mine shaft, this length may be several feet.

The annular sleeve 14 may be cylindrical and has a sufficient inner diameter to receive the stud 12 therethrough coaxially. In addition, the inner diameter of the sleeve is sufficient to provide an annular radial clearance 26 between the radially inward surface 28 of the sleeve and the cylindrical surface 30 of the stud, the reason for which shall be explained below. Radially inward surface 28 preferably is smooth, while radially outward surface 33 may be threaded, striated, or otherwise textured to provide a frictional gripping surface for contacting the wall of a predrilled hole. The outer end 34 of the sleeve may have a radially inwardly extending shoulder 36 terminating in close proximity to stud surface 30 for the purpose of maintaining the sleeve in coaxial relationship with the stud. Alternatively, shoulder 36 may be a washer that is not attached to the sleeve but that aids in limiting the travel of the sleeve toward the outer end of the stud. Starting at the inner end 38 of the sleeve, best shown in FIG. 3, one or more grooves or slots 40 may be formed in the sleeve and extend axially toward end 34, although all such slots terminate before reaching end 34, creating an unbroken ring 42 at end 34. In the preferred version of the sleeve, four such slots are employed in symmetrical distribution about the circumference of the sleeve. The sleeve is preferably formed from iron or steel pipe that is annealed to spring steel after being threaded or otherwise textured on its circumferential surface.

Wedge member 16 is generally frusto-conical in form with inner end 44 having a greater diameter than outer end 46. The radially outward surface 48 is then tapered from broad end 44 to narrow end 46. The radially inward surface 49 of the wedge is threaded to match threaded portion 22 of the stud. Surface 48 carries ribs 50 in corresponding number and position to the slots 40 of sleeve 14. Each rib is received in a slot 40, which is of sufficient width to allow the rib to enter axially. The radial height of each rib is preferably less than the height of a slot, which is also the thickness of the sleeve between sides 28 and 33. The inner end 44 of the wedge has a radial thickness that is less than or equal to the clearance 26 between the sleeve and stud, allowing the wedge to initially enter the clearance without having to deform the sleeve. The inner end 44 of the wedge is substantially larger than the outer end thereof and clearance 26. For example, the total diameter of the inner end may be between 10% and 20% larger than the inner diameter of sleeve 14, with a diameter 15% larger than the inner diameter of the sleeve being preferred.

The nut member 18 may be any variety of conventional nut adapted to fit the threading 20 on the outer end of the stud. For example, as best shown in FIG. 2, the nut is of the kind having hexagonal outer surface 52, outer end surface 54, and inner radial surface 56 having threads thereon for engaging stud threading 20, and inner end surface 58, FIG. 1. Closely associated with the nut member is a rock shoulder plate 60, which may take the form of a conventional heavy duty washer inserted over one end of the stud and held between the nut at the outer end of the stud and the sleeve at the inner end of the stud. If desired, the plate 60 may be integrally attached to the nut inner face 58. Plate 60 is annular in form and has a radial dimension in excess of the maximum radial dimension of the nut member and also in excess of the intended diameter of the predrilled hole.

The various described elements of the roof bolt are held in place by appropriate retaining means. Sleeve 14 is prevented from moving axially outwardly on stud 12 by means such as a retaining pin 62 inserted into a radially inwardly extending hole 64 formed in stud 12 at any desired position marking the intended maximum outward travel of the sleeve. Other appropriate sleeve retaining means could be an enlarged shoulder on the stud, or a welded connection between shoulder 34 and the stud, but pin 62 is preferred for its strength, versatile installation, and ease of fabrication.

Wedge 16 is retained on the stud in part by backing plate 66 welded in inner end 17. This plate has a larger diameter than the stud, and may have a diameter either larger or smaller than the inner diameter of the sleeve 14, although the diameter should be equal or smaller than that of wedge end 44. Alternative retaining means for the wedge may include a radially outwardly extending flange in the inner end of the stud, or a pin similar to pin 62 inserted through the stud near end 17. Plate 66 is preferred for low cost ease of attachment and compactness at the inner end of a hole into which the roof bolt may be inserted. The primary function of the plate is to act as a stop preventing the wedge from accidently becoming lost before the bolt is inserted in the hole, and a secondary function is to prevent the wedge from being unscrewed from the stud if it is desired to remove the bolt from the hole. In neither application is extreme strength critical.

A final important retaining device is shear pin 68 inserted into hole 70 formed in coaxial portions, the radially outer portion being through nut 18 and the radially inner portion being through at least a part of stud 12. Pin 68 is formed from any suitable material and has suitable dimensions to shear at a prescribed torque value exerted on nut 18 relative to stud 12. Various metals and alloys are known to be suitable for this purpose, and accordingly no further description is required.

In operation, the roof bolt is intended for use with a predrilled hole of predetermined length, preferably not substantially shorter than the bolt, although a short length of the bolt will protrude from the outside of the hole. The bolt is inserted into the hole and the nut portion is engaged by a wrench, for example a pneumatic wrench, that turns the nut in the tightening direction, for example clockwise as viewed in FIG. 2. The nut and stud will turn in unison because the shear pin initially serves to key the nut and stud together. Sleeve 14 and wedge 16 are also keyed together by the engagement of ribs 50 in slots 40, but the sleeve and wedge are otherwise free to rotate with respect to the stud and nut, or vice versa. The diameter of the predrilled hole is reasonably similar to or slightly larger than the outer diameter sleeve 14, resulting in the sleeve having some frictional engagement between the outer surface 32 and the side of the predrilled hole. Alternatively, if the diameter of the inner end 44 of the wedge is larger than the outer diameter of the sleeve, the diameter of the hole will be similar to or slightly larger than this end 44, resulting in frictional engagement between the wedge and the hole wall. In either event, the wedge-sleeve unit will be retarded from turning with the nut-stud unit, resulting in the wedge being advanced toward the outer end of stud 12 as the nut-stud unit rotates. At the same time, the sleeve is prevented from so advancing by the sleeve retaining means, pin 62, causing the wedge to be forced into the clearance 26 and to cam the sides of the sleeve radially outwardly into firm engagement with the wall of the predrilled hole in the rock.

Depending on the initial positioning of the roof bolt, the rock shoulder plate 60 may be loosely adjacent to the rock shoulder around the predrilled hole during the camming of the wedge into the sleeve. In this case, when the wedge is driven into clearance 26 with sufficient pressure, the shear pin will yield at the prescribed torque value, and the nut will advance for a short distance to press the plate firmly against the rock shoulder around the hole.

Alternatively, the wedge may be forced into the sleeve before the plate has seated against the shoulder around the hole. In this instance, the only difference in operation is that the nut will advance for a greater distance after the shear pin yields to the predetermined torque, resulting in the same firm seating of the plate against the rock shoulder. In either case, two important ends are reached: First, the wedge is driven into the sleeve with a desired predetermined torque for firm engagement of the sleeve outer surface with the wall of the predrilled hole; and second, the rock shoulder plate is firmly pressed against the shoulder of the hole after the wedge has been properly set. This assures that the roof bolt will not slip in the predrilled hole, and that the rock between the anchored portion of the sleeve and the rock plate is under proper compression.

One variation of the roof bolt that may be usefully employed involves the addition of an eye to end 19 of the stud, or alternatively, the substitution of an eyebolt for the stud. In such a configuration, the device may be referred to as a slusher pin. A pulley block may be attached to the eye and any appropriate load may then be suspended from the pulley. For this application, it is not necessary that sleeve 14 be deeply located in a hole. Rather, sleeve 14 may be integrally attached to rock plate 60, which as before remains at the shoulder of the hole. Pin 62 is then unnecessary to hold the sleeve at the desired depth in the predrilled hole. The main function of a slusher pin is to maintain a tight grip in the hole, thereby supporting an applied external load.

I claim:

1. An expansion bolt for use in a predrilled hole of predetermined diameter in rock or like materials, comprising in combination:

(a) an elongated stud of uniform diameter having first and second threaded end portions and an intermediate shank portion, said first end being adapted for insertion into the predrilled hole and the second end remaining outside the hole;

(b) a cylindrical expansion sleeve extending axially around the stud near the first end thereof and covering at least part of the threading on said first end, said sleeve having a uniform inner diameter greater than the outer diameter of the stud for creating an uniform annular radial clearance between the sleeve and stud, and wherein the sleeve has at least four axially extending slots originating at the end of the cylinder nearest the first end of the stud and terminating prior to the opposite end of the cylinder to define an unbroken ring at said opposite end, said slots being symmetrically arranged about the circumference of the sleeve, and the sleeve being formed of spring steel;

(c) a retaining pin carried in a hole formed in the shank portion of the stud and extending radially outwardly therefrom for limiting the movement of said sleeve toward the second end of the stud;

(d) an annular shoulder member carried on the stud between said retaining pin and the expansion sleeve and having an inner diameter closely similar to the outer diameter of the stud;

(e) a frusto conical wedge member threadedly engaged to the first end of said stud and axially aligned therewith, having its narrowest end facing said sleeve and having ribs on the circumferential surface thereof corresponding in number and position to said slots for engaging the slots and holding the sleeve and wedge member in similar rotational position on the stud, the narrow end of the wedge having a radial thickness no greater than said annular radial clearance between the sleeve and stud;

(f) a backing plate attached to the first end of the stud and having a diameter larger than the diameter of the stud and no larger than the maximum diameter of the wedge member;

(g) a threaded nut member engaging the second threaded end portion of the stud, the nut member and stud having an aperture formed diametrically therethrough adapted to be coaxially aligned;

(h) a shear pin carried in the aperture of the nut and passing through the aperture of the stud for maintaining the nut and stud in fixed rotational positions until a predetermined torque is applied to the nut; and (i) a shoulder plate washer engaging the stud between the nut member and retaining pin and having a larger diameter than the predetermined diameter of the predrilled hole.

* * * * *